C. E. AKELEY.
PROCESS OF PRODUCING AND DEPOSITING PLASTIC OR ADHESIVE MIXTURES.
APPLICATION FILED JAN. 22, 1908.
984,254.
Patented Feb. 14, 1911.
2 SHEETS—SHEET 1.
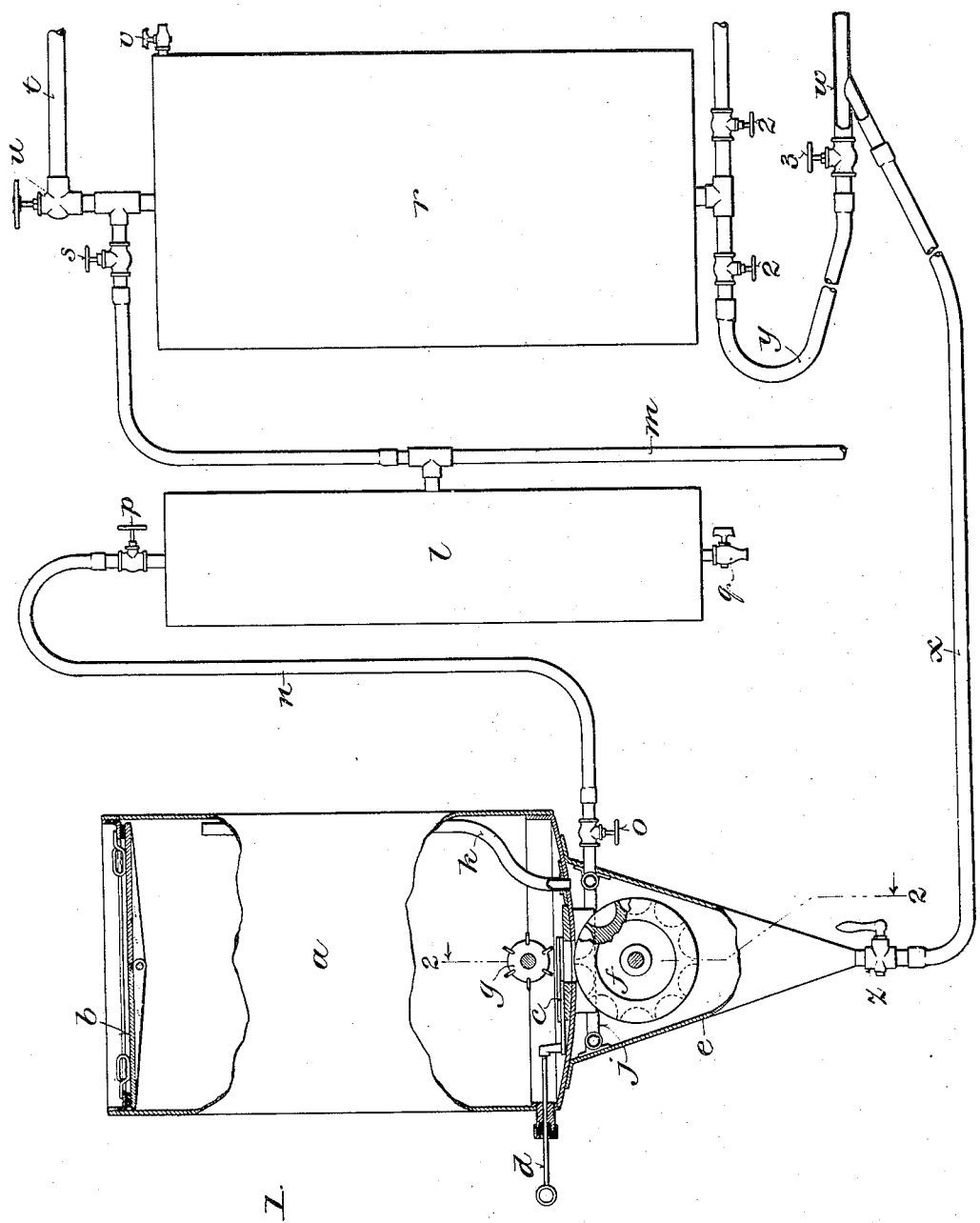

C. E. AKELEY.
PROCESS OF PRODUCING AND DEPOSITING PLASTIC OR ADHESIVE MIXTURES.
APPLICATION FILED JAN. 22, 1908.
984,254.
Patented Feb. 14, 1911.
2 SHEETS—SHEET 2.
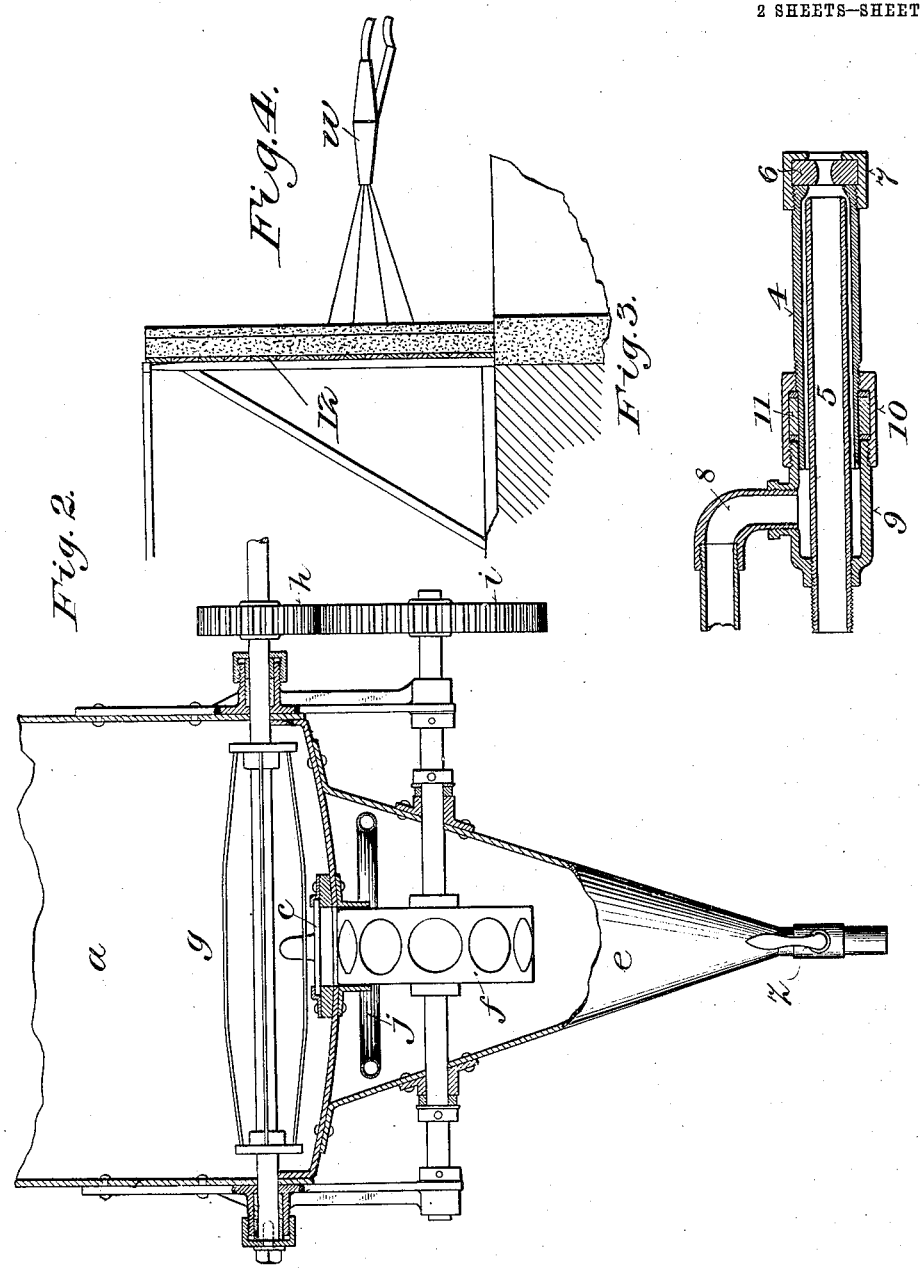
Witnesses:
Fred Palm
Chas. L. Goss.
Inventor:
Carl E. Akeley
By Whittle, Flanders, Bottum & Fawsett
Attorneys.

UNITED STATES PATENT OFFICE.

CARL E. AKELEY, OF CHICAGO, ILLINOIS, ASSIGNOR, BY MESNE ASSIGNMENTS, TO McELROY SHEPHERD COMPANY, A CORPORATION OF NEW YORK.

PROCESS OF PRODUCING AND DEPOSITING PLASTIC OR ADHESIVE MIXTURES.

984,254.

Specification of Letters Patent. Patented Feb. 14, 1911.

Application filed January 22, 1908. Serial No. 412,079.

*To all whom it may concern:*

Be it known that I, CARL E. AKELEY, a citizen of the United States, residing at Chicago, in the county of Cook and State of Illinois, have invented certain new and useful Improvements in Processes of Producing and Depositing Plastic or Adhesive Mixtures, of which the following is a specification, reference being had to the accompanying drawing, forming a part thereof.

My invention relates to an improved method or process of making concrete. What I mean by concrete is a conglomerate formed by the use of hydraulic cement, sand and water. The process is equally adaptable to the formation of stucco or the application of cement alone, or cement in combination with other elements, such as sand, or the equivalent, and when I use the expression cement, I mean any of those binding agents which are made effective by hydration, and what I mean by hydration is the bringing together of any such cements with water or water vapors in such a way as to make them effective. What I mean by sand is any kind of comminuted material adapted to coöperate with such cement in forming a concrete. In this specification and claims, for the sake of brevity, I refer to cement, water and sand, but I do not intend to limit myself to those materials; any materials of a kindred nature may be employed.

The methods usually heretofore employed for the hydration of hydraulic cements and the mixing of the same with sand or equivalent substances has been to introduce the cement and sand into a container with a certain quantity of water and by mechanical agitation to thoroughly mix the elements, the water combining with the cement and causing the same to form with the sand or equivalent substances, a conglomerate commonly known as mixed cement, or mixed mortar, or mixed stucco, as the case may be. This mixed material has been applied in various ways. Where it was sought to make a concrete associated with broken stone, or the like, a concrete has been mechanically mixed with the stone and tamped into appropriate forms where it is permitted to harden; where, on the other hand, it was desirable to use the plastic material as a binding agent for the holding together of materials, covering of walls and the like, it has been applied with a trowel or otherwise.

I have observed that where cement and sand are manipulated in the manner indicated to form a concrete, certain inherent defects are found in the concrete, due, as I believe, to a failure to truly comprehend the natural laws which govern the operation of the elements which go to form the concrete.

My present invention has as its purpose to overcome these difficulties and correctly employ the laws of nature referred to. One of these laws may be briefly stated to be that hydraulic cement is more efficient as a binding agent when it is permitted to set shortly after hydration and without physical disturbance, in a position where it is intended permanently to remain. In the former process of making a concrete, the utilization of this law was impossible from the nature of its performance, as the cement was hydrated and mechanically mixed with sand or similar material, and when mixed, the conglomerate was taken to the place of application and applied, the result being that the crystalline form of the hydrated cement was necessarily broken and hence made less effective as a binding agent. Another law is that hydraulic cement is more effective when hydration is accomplished with just the amount of water needed to supply the water of crystallization, and that under proper conditions such cement will take up the exact amount of water or moisture for this purpose. In the operation of the former process such conditions were impossible in the nature of the performance.

Under the former process, cement, sand and water were placed in a container and there mechanically manipulated. In this case, if the supply of water be only such as will enter into chemical union with the cement, it will be likely to set at once, and any further handling or manipulation of the same will be calculated to disturb the initial crystallization, and in so doing, impair its binding quality. Furthermore, if it hardens, it will be difficult to handle and less effective when applied. To prevent this result and to maintain the mixture in a plastic state long enough to be applied to the work, it is customary to employ considerably more water than the cement requires for the purpose of retarding the setting and to allow sufficient time in which to mix and apply the conglomerate. Furthermore, when the sand and cement are mechanically mixed under the conditions stated, the operation has the effect of breaking the crystallization and dislocating the bond which is established as soon as the cement is hydrated. The result of this excessive hydration and mechanical mixing, is that water and air are included in the conglomerate and bound therein, the effective strength of the cement is also broken or impaired. When the concrete is permitted to dry, the excess of water evaporates and the inclosed air is released, leaving the concrete in a porous condition, which is obviously undesirable as a dense concrete is preferable for purposes of strength, hardness and water-proof qualities. The concrete thus formed has heretofore been applied as mixed concrete, by mechanical application to the object to be treated. Such means of application have been fraught with difficulties and prescribed narrow limitations for its operation. I recognize, of course, that the conditions above set forth are necessarily incident to the operation of the process of making concrete as heretofore practiced. My present process has for its purpose the over-coming of these difficulties and the supplying of a process in the operation of which these laws will be utilized to the best advantage.

In the operation of my process, I bring the dry cement and sand, either separately or mixed, together in appropriate proportions to the point of delivery adjacent to the point of application. Through a separate conveyer I bring water to the same point, and under pressure I forcibly project the three elements together against the object or structure. In carrying out my process I prefer to unite the three elements, sand, cement and water, in a suitable nozzle from which they are together forcibly projected against the object. I have observed that the conditions which I bring about in the projecting of these elements, to wit, cement, sand and water together in the manner indicated, permit the cement to take up just enough water or moisture to effectively bring about its crystallization. The particles of cement, having taken up the right amount of water, are violently projected against the object where they are intended to remain and set, thus these particles are immediately upon hydration placed in position where they are to remain. They are not again disturbed, and in view of the fact that they have taken up only sufficient water for the purpose of their hydration, they rapidly crystallize and set. The fact that the sand is also brought in contact with the water, wets it sufficiently to be united with the cement. In other words, the individual particles of sand are moistened and are consequently in a better condition to coöperate with the cement in forming the concrete. Furthermore, the fact that all of these elements are violently projected against the object continuously and forcibly operates to drive the particles home into the interstices of the surface presented, thus tamping the concrete as it is formed and expelling surplus water or included air that may be present, leaving the concrete hard, dense and homogeneous.

I have observed and, I believe, discovered that in the operation of my process a natural law of selection is utilized, that is to say, a selection by the cement of just sufficient water to accomplish its hydration and a discarding of the surplus amount of water and also a selection of the exact amount of sand which will most efficiently coöperate with the cement in the various stages of the operation of the process. For instance, when the three elements, water, cement and sand, are projected against a vertical object in the initial operation of the process, only so much water and sand unite with the cement as the cement can hold,—the rest falls away, leaving the hydrated cement in an almost pure state. It may take up a small quantity of sand, but I have observed that the initial coating is very rich in cement. As the operation proceeds, however, after the first coating of cement is laid on, an adhesive and plastic surface is formed, capable of receiving and retaining the sand, or sand and cement, as the same are projected against the object. Thus, it will be found that the resultant product is stratified. The portion adjacent to the object is high in cement values; whereas, the remaining portion of the concrete contains a mixture of sand and cement according to a predetermined ratio fixed in the source of supply. I have also observed another law of selection which is incident to the operation of my process, which is based on the fact that cement will only take up and coöperate with, effectively, a certain amount of sand. My experience has demonstrated that a mixture of one part of cement and three of sand is usually very effective. If, however, I should make the mixture one part of cement to nine of sand, or any other proportion which would not be effective, a certain portion of the sand will fail to unite with the cement and fall to the ground, where the object is vertical. Of course, this would not be so where the object is horizontal, and there is no opportunity for the sand to escape from its placement, but I have observed and desire to note that this is another law of nature by which in the operation of my process, a selection of the amount of sand, which would be sufficient, is made.

It will be obvious that cement, sand and water applied by my process will adhere to a surface and make a far more efficient binding union with such surface than would be possible in the application of concrete mixed under the former process, for the reason that it is applied in individual particles at successive intervals of time, and the cement is hydrated suddenly and applied directly thereafter without mechanical manipulation which would be liable to disturb its crystallization, and thus impair its effectiveness as a binding agent. The fact also, that the elements which go to make the concrete, are applied forcibly simultaneously and continuously against the object or structure under treatment, operates to tamp the conglomerate in a peculiarly efficient manner and drive out any excess of water or air that may be present therein,—thus making a dense and consequently hard and waterproof concrete.

In the operation of my process, I have observed that the conglomerate consisting of cement, sand and water, when applied according to the process above described, set quickly when it is applied in layers or laminations, each layer or lamination being permitted exposure to the atmosphere for a period of time before another lamination or layer is laid on, and so continuously until the required thickness is attained. In practice, this period of time is usually very brief. When I am coating a wall for instance, I begin operations at one end of the wall and having laid on a certain thickness, I continuously proceed with the operation to the end of the wall and then return, proceeding continuously over the same surface. This interval of time, I have observed, permits the material to partially set and a portion of the water to run off or to be evaporated therefrom. The plan is, however, not essential to the operation of the process as it is perfectly possible to project the materials continuously against the object until the desired thickness is obtained.

When I refer in this specification and claims to the projection of cement, sand and water against an object, I intend to be understood as meaning the surface of such object interposed in the passage of the materials projected. And when I refer to a vertical object I do not intend to be understood as meaning an absolutely vertical surface, any surface presented as an obstacle to the free passage of the materials which is of sufficient inclination to permit the surplus water and sand to escape would be within my intended meaning. Where, however, the object interposed is horizontal or so inclosed as to prevent the escape or separation of the sand and water, it is obvious that the law of selection herein described would not operate.

By my invention I eliminate the defects of the old method. The materials are mixed and deposited and the cement hydrated at a single operation so that premature setting cannot possibly take place, and each particle is applied with force to the place it is to occupy on the finished structure, forming an exceedingly compact body.

In applying my process, the material is led to a nozzle, by means of which the workman so directs the material that the arresting surface is simultaneously sprayed with solid and liquid which is deposited thereon in the form of a plastic. The material is deposited preferably continuously and distributed over the whole surface until the desired thickness of the wall or coating to be produced is attained.

The relatively dry material such as stucco, plaster, cement, sand or the like, or a suitable combination of dry materials and a suitable liquid such as water capable of forming, when combined, a plastic or adhesive substance, are separately conveyed, preferably in partial confinement as in pipes, from separate points of supply to or adjacent to a point of union, and are delivered either before or after union in the form of a stream or jet to the point of deposit, the mixture and deposit taking place as a single operation.

Conveyance of the dry material or materials through its conducting pipe or pipes may be accomplished by a blast or current of air, and when several dry materials are employed, they may be mixed in the proper proportion and placed in a single receptacle for measured delivery to the pipe or brought together in measured proportions while in transit to the point of deposit as in a mixing nozzle. The liquid ingredient which is generally water, may be forced through its pipe under pressure, preferably at a measured rate, and the two separately conducted ingredients, dry and liquid in definite proportions, are projected simultaneously by the impelling force which may be the current of air and the water pressure described, or any other means of transmitting force. By the proper regulation of the supply of dry material and of the liquid through the nozzle, the constituency of the plastic formed by their mixture, may be readily varied as desired to suit different conditions and requirements.

By this process the ingredients are thoroughly and uniformly mingled in proper proportions and a plastic of uniform constituency is continuously produced as required, and is thoroughly and evenly tamped as it is applied and deposited, producing a dense coating or mass.

The accompanying drawings show a simple arrangement of apparatus suitable for carrying out my process.

Figure 1 is an elevation of one form of apparatus, the receptacle for dry material and the mixing nozzle being shown partially in section. Fig. 2 is an enlarged section on the line 2, 2 Fig. 1 of the lower part of the receptacle for dry material. Fig. 3 is an enlarged axial section of a modified form of mixing nozzle. Fig. 4 is a fragmentary section of solid wall in the process of construction, showing the operation of projecting materials against the arresting surface to form the wall.

In the drawing there is a closed receptacle "a" for dry material such as Portland cement, lime, sand, etc. At the top there is a charging opening and a removable cover "b" for the opening; at the bottom is a discharge opening controlled by an adjustable slide valve "c", having a handle "d", projecting through a stuffing box and slide bearing at one side. Below the discharge opening is a funnel or feed chamber "e" in which is a feed wheel "f" having pockets in its periphery which register in turn with the discharge opening. Above the discharge opening is a rotary agitator "g" for breaking up lumps in the powdered material. The agitator and feed wheel may be turned by any suitable means as gears "h" and "i" applied to the shaft of the agitator which is provided with any suitable crank or pulley not shown. A circular nozzle or perforated pipe "j" surrounds the feed wheel "f" in the upper part of the funnel "e". From the funnel "e" a pipe "k" leads to the top of chamber "a" to equalize the pressure. The nozzle is supplied with air by way of a pipe "n" leading from the top of a reservoir "l". In the pipe "n" are valves "o" and "p". The lower part of the reservoir is provided with a cock "q" for releasing the air and condensed water. The reservoir is filled with air under pressure by way of a pipe "m" to which may be connected any convenient compressor not shown.

Liquid is supplied from a tank "r" to the upper portion of which the air pipe "m" provided with a valve "s" leads. Water is supplied to the tank by a pipe "t" having a valve "u".

Connected to the funnel "e" of the receptacle "a" for dry material by means of a pipe "x" having a valve "z" and to the bottom of the liquid tank "r" by means of a pipe "y" having valves "2" and "3", is a nozzle "w".

In place of the nozzle shown in Fig. 1, I may use one of the type shown in Fig. 3 having an outer tube "4", an inner tube "5", a mouth-piece "6" made of soft rubber and secured to the end of the outer tube "4" by means of a coupling ring "7". Liquid is supplied through the branch connection "8", to the outer tube "4", and the dry material is supplied to the inner tube. Tube "4" fits into a sleeve "9" and both the tube and sleeve are threaded into a coupling ring "10" by which they are adjustably connected. Between the tube and the sleeve within the coupling ring is a packing ring "11" at each end of which is a metal ring or washer. The object of using soft rubber for the ring "6" is to prevent excessive wear at this point. By means of this nozzle the liquid will be delivered in the form of a cone surrounding the stream of dry material as it issues from the inner tube. With either nozzle the dry and liquid materials will be intimately mixed, applied and compacted in a single operation.

In the operation of the apparatus as shown, when it is desired to refill the liquid reservoir "r", the valves "s" and "2" are closed; the cock "v" is opened to release the compressed air, and the valve "u" opened to admit water or other liquid through the pipe "t". If the liquid is supplied under sufficient pressure, refilling may be accomplished without closing valves "2" and "s" and without interrupting the operation of the apparatus.

In Fig. 4 I have shown a portion of a wall or other structure in the course of construction by my method. There is a wall or other structure "12". Material is sprayed against the wall or other structure from the nozzle "w", the latter being continuously and uniformly deflected to distribute the material evenly over the surface. The wall is formed by the gradual deposit of the material on the wall or other structure, the thickness of the wall increasing as the operation progresses, it being maintained substantially uniform throughout by manipulation of the nozzle as described. As shown, the wall is about five-eighths completed.

The dry and liquid constituents of the plastic to be applied are projected against the wall, as described, from the nozzle "w". They are thus mixed, deposited and tamped at a single operation, forming a coating in which the force of application drives out the surplus water and included air and compacts, the cement coating making it hard and adherent.

In both cases the coating or wall formed is non-porous and substantially water-proof. Superfluous water and body material are rejected without loss of the cementitious constituent.

I have thus described in specific terms a single embodiment of the method and apparatus by means of which the process of my invention may be accomplished, but I desire to have it understood that the specific terms herein are used in their descriptive and not in their limiting sense. The scope of the invention is defined in the accompanying claims.

I claim—

1. The method of forming a cement structure, which consists of projecting cement, sand and water, simultaneously, with force, against a wall or other structure, whereby the materials are mixed, hydrated, and combined in suitable proportions in the position which they are to occupy in the finished structure.

2. A method of applying hydraulic cement concrete which consists of conducting the dry and liquid materials composing the same, continuously from separate sources and forcibly projecting them simultaneously on the same point of application.

3. The method of mixing and applying hydraulic cement-concrete, which consists in projecting the dry materials, forcibly, into the position which they are to occupy permanently on the finished structure, and simultaneously projecting water at the same point.

4. The process of mixing, hydrating and applying hydraulic cement, which consists in forcibly projecting the dry and liquid materials, simultaneously, at the point of application.

5. The process of applying hydraulic cement, mortar or concrete containing the same and similar concretes and cements and mortars, which consists in forcibly projecting the dry and liquid constituents of the same, simultaneously, at a suitable forming surface, thereby mixing, depositing, and tamping the materials, and hydrating the cement, in a single operation.

6. The process of mixing and applying hydraulic cement mortar which consists in conducting the dry and liquid materials from separate sources to a nozzle, mixing them therein, and projecting them therefrom, with force, upon a suitable structure whereby deposit and hydration are accomplished simultaneously and all premature setting is prevented.

7. The process of producing an adhesive mixture which consists in conveying relatively dry comminuted material and liquid in separate partial confinement from separate sources of supply, and bringing such substances together while in transit adjacent to the point of delivery of said substances from such confinement.

8. The process of producing a plastic mixture which consists in conducting liquid and relatively dry comminuted material in separate partial confinement from separate sources of supply, bringing said materials together while in transit adjacent to the point of delivery from such confinement, and continuously depositing the mixture thus formed.

9. The process of producing and applying a plastic mixture which consists in separately conducting in continuous transit, liquid and relatively dry comminuted material from separate sources of supply, bringing such materials together while in transit and continuously depositing the mixture with force in a compacted coat or body.

10. The method of hydrating hydraulic cement which consists in forcibly projecting water and cement into the atmosphere so that these materials, as separated particles, are combined in the air.

11. The method of hydrating hydraulic cement and associating the hydrated cement with sand or other substances which consists in forcibly projecting water, cement and sand into the atmosphere so that these materials, as separated particles, meet in the air.

12. The method of hydrating hydraulic cement which consists in forcibly projecting water and cement into the atmosphere so that these materials, as separated particles, are combined in the air.

13. The method of hydrating hydraulic cement and associating the hydrated cement with sand or other substances which consists in forcibly projecting water, cement and sand into the atmosphere so that these materials, as separated particles, mix in the air and are driven with force against an interposed object in contradistinction to mechanically mixing the same materials in a container.

14. The method of hydrating hydraulic cement and uniting the hydrated cement with sand or similar materials which consists in exposing the cement and sand, as separated particles, to the action of water or water vapors in transit through the atmosphere.

15. The method of hydrating hydraulic cement which consists in exposing the cement to the action of water or water vapors, the cement and water being projected forcibly in the atmosphere where they are caused to meet as separated particles.

16. The method of hydrating hydraulic cement which consists in exposing the cement to the action of water or water vapors, the cement and water being projected forcibly into the atmosphere where they are caused to meet and proceed together against an object.

17. The method of hydrating hydraulic cement and uniting the same with a suitable amount of sand to form a concrete which consists in causing the dry cement and sand, as separated particles, to be forcibly projected into water or moisture from which the cement may take up sufficient moisture to accomplish its hydration.

18. The method of hydrating hydraulic cement and uniting the same with a suitable amount of sand to form a concrete which consists in causing the dry cement and sand, as separated particles, to be forcibly projected into water or moisture from which the cement may take up sufficient moisture to accomplish its hydration and proceed together with the sand to an object.

19. The method of forming concrete which consists in forcibly projecting the constituent elements, uncombined at the time of projection, against an object.

20. The method of forming concrete which consists in forcibly projecting the constituent elements, uncombined at the time of projection, against an object, first on one part of the object and then on another.

21. The method of forming concrete which consists in forcibly projecting the constituent elements thereof, uncombined at the time of projection, against a vertical object.

22. The method of forming concrete which consists in forcibly projecting the constituent elements thereof, uncombined at the time of projection, simultaneously against a vertical object.

23. The method of forming concrete which consists in forcibly projecting the constituent elements thereof, uncombined at the time of projection, simultaneously and continuously against a vertical object.

24. The method or process of making a mixture of unhydrated hydraulic cement, water and sand for the purpose of forming a hydrated concrete, which consists in forcibly projecting these materials, uncombined at the time of projection, simultaneously against an object.

25. The method or process of making a mixture of unhydrated hydraulic cement, water and sand which consists in forcibly projecting these materials, uncombined at the time of projection, simultaneously against a vertical object.

26. The method or process of making a mixture of hydraulic cement, water and sand which consists in simultaneously and forcibly uniting these materials in a common receptacle and forcibly ejecting the combined material from said receptacle against an object, the application being made first against one part of the object and then against another part of the object and then against the first part treated and so on continuously, allowing sufficient intervals of time to elapse between the applications to permit partial evaporation of the water and partial setting of the cement.

27. The method or process of forming a concrete which consists in separately conveying the dry material to a receptacle and separately conveying the liquid to the same receptacle, the supply being continuous and forcibly and continuously projecting the conglomerate against an object.

28. The method or process of forming a concrete which consists in separately conveying the dry material to a receptacle and separately conveying the liquid to the same receptacle, the supply being continuous, and forcibly and continuously projecting the conglomerate against a vertical object.

29. The method of forming concrete which consists of forcibly projecting cement, sand and water, uncombined at the time of projection, against an object and laying the particles upon one another, particle by particle, with an interval of time between the application of adjacent particles.

30. The method of hydrating hydraulic cement and associating the hydrated cement with sand or other substances which consists in forcibly projecting water, cement and sand into the atmosphere so that these materials, as separated particles, are driven with force against an intervening object, and laying the particles one upon another, particle by particle, with an interval of time between the application of adjacent particles.

31. The process of producing and applying an adhesive mixture to the surface to be coated with such mixture, which consists in separately conveying relatively dry, comminuted material and liquid in partial confinement, from separate sources of supply, bringing said substances together adjacent to the point of delivery thereof, from such confinement, and thence projecting the mixture upon the surface to be coated, maintaining the substances continuously in motion throughout their transit from the points of supply to the point of application.

32. The process of producing and delivering a plastic or adhesive mixture, which consists in separately conveying relatively dry and comminuted material and liquid in partial confinement, from separate sources of supply and bringing said substances together during transit and while under partial confinement, adjacent to the point of delivery from such confinement.

33. The process of producing and applying a plastic mixture, which consists in separately conducting liquid and relatively dry, comminuted material in partial confinement, from separate sources of supply, bringing such materials together while in motion, adjacent to the point of, but before delivery, and depositing the mixture, thus produced, upon the surface of the structure to which it is to be applied.

34. The process of producing and depositing a plastic mixture which consists in separately conducting in partial confinement, from separate sources of supply a liquid and relatively dry comminuted material, bringing such materials together near the point of delivery from such confinement, and continuously projecting with an air blast the mixture thus formed in an unconfined jet against the surface or object to which it is to be applied.

In witness whereof I hereto affix my signature in presence of two witnesses.

CARL E. AKELEY.

Witnesses:
 CHAS. L. GOSS,
 JOHN H. HURLEY.